Sept. 8, 1964  J. HÜBL ETAL  3,147,649
APPARATUS FOR FEEDING WORKPIECES TO A ROLLING MACHINE
Filed July 18, 1961  3 Sheets-Sheet 2

Inventors:
Johann Hübl
Horst Conrad
BY
ATTORNEY

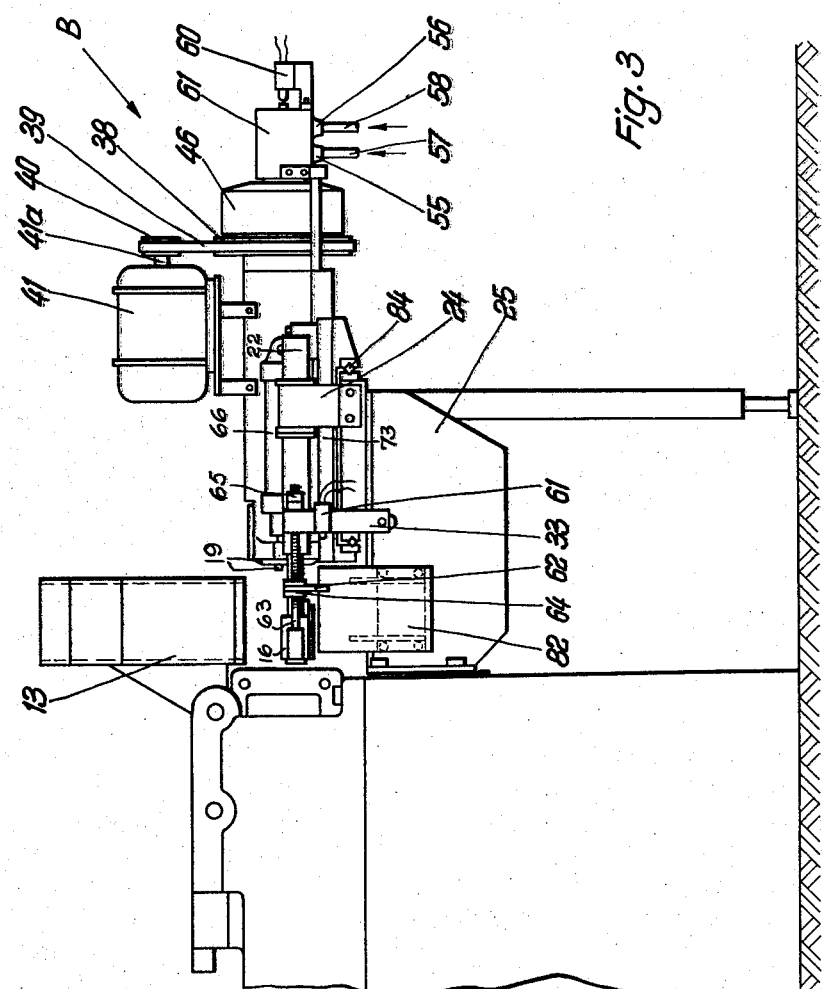
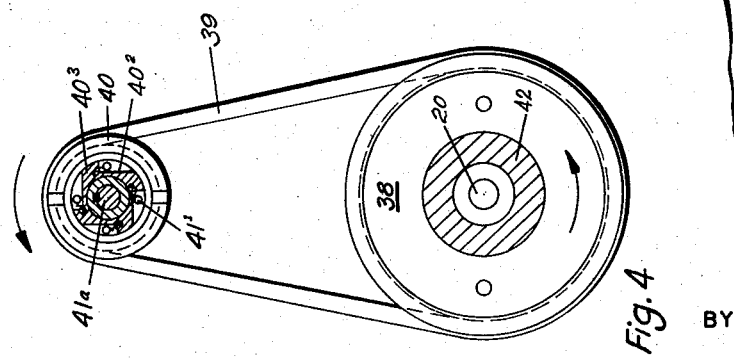

United States Patent Office 3,147,649
Patented Sept. 8, 1964

3,147,649
APPARATUS FOR FEEDING WORKPIECES
TO A ROLLING MACHINE
Johann Hübl, Berlin-Halensee, and Horst Conrad, Berlin-Heiligensee, Germany, assignors to Pee-Wee Maschinen- und Apparatebau Werner Plagemann, Berlin-Germany, a firm of Germany
Filed July 18, 1961, Ser. No. 124,967
Claims priority, application Germany, July 27, 1960,
P 25,422
6 Claims. (Cl. 80—43)

Our invention relates to an apparatus for supplying rotational, preferably preheated workpieces to a rolling machine which may include two or more cooperating profiling rollers.

It is known to hold the workpieces to be rolled in a reciprocably mounted chuck which advances the workpieces towards and between the profiting rollers of the rolling machine. It is also known to rotate such chuck while the same holds a workpiece during the advancing or feeding movement. Such preparatory rotation of the workpiece avoided to a certain degree irregularities of the rolled workpieces which arose when the same were rotated only by the acting profiling rollers. Such preparatory rotation of the chuck was effected by a gearing driven by the shafts associated with one of the profiling rollers, the transmission ratio of such gearing conforming to the ratio of the constant diameter of the rollers and of the differing diameters of the operated on workpieces, respectively. As this ratio of the diameters changes, it appeared necessary to change the speed of said preparatory rotation by exchanging pinions in said gearing or by providing a change gear. Such dependence of the preparatory rotational speed from the diameters of different workpieces is naturally disadvantageous. Also, the gearing effecting said preparatory rotation of the workpiece had always to be disengaged to permit the clamping of another workpiece in the chuck. Thus the output of the known rolling machines was not very effective, particularly not when working on preheated workpieces, because the clamping and advancing operation required too much time to keep the workpiece sufficiently hot up to the time when it entered between the profiling rollers.

It is an object of our invention to avoid the said disadvantages and to provide an apparatus which will feed preheated workpieces between the profiling rollers of a rolling machine without interruption and without regard to the temporarily existing ratio of the diameters of the workpiece and of the profiling rollers.

According to our invention the preheated workpiece is fed to and clamped in a rotating chuck which rotates the workpiece at an angular velocity differing from that of the profiling rollers the difference between these velocities being compensated within the drive means for said chuck. Advantageously the angular velocity of the chuck is smaller than that of the profiling rollers and the means rotating the chuck include an override device which compensates the difference in said angular velocities when a workpiece in said chuck is rotated by the profiling rollers.

Our invention permits to attain continuously, effectively and economically a substantial profiling on red-hot workpieces for example the profiling of round heads on bolts or of beadlike profile.

Our new apparatus for feeding workpieces between profiling rollers of a rolling machine comprises a reciprocably and rotationally mounted chuck for the workpiece, driving means permanently rotating said chuck with an angular velocity which is different from that of the profiling rollers, and within said driving means adjustable slipping or overriding means adapted to compensate the difference of the angular velocities of the profiling rollers and of the workpiece, respectively.

The above described and other objects of our invention will be more fully understood from the following specification when read with the accompanying drawing in which one embodiment of our new apparatus is illustrated.

In the drawing—

FIG. 1a shows in larger scale a longitudinal section of a clamping chuck used in our new apparatus together with the elements directly associated therewith;

FIG. 3 is a front view thereof; and

FIG. 4 shows a side view, partly in section, of an embodiment of a slipping or override coupling used in our new device.

Figure 1:
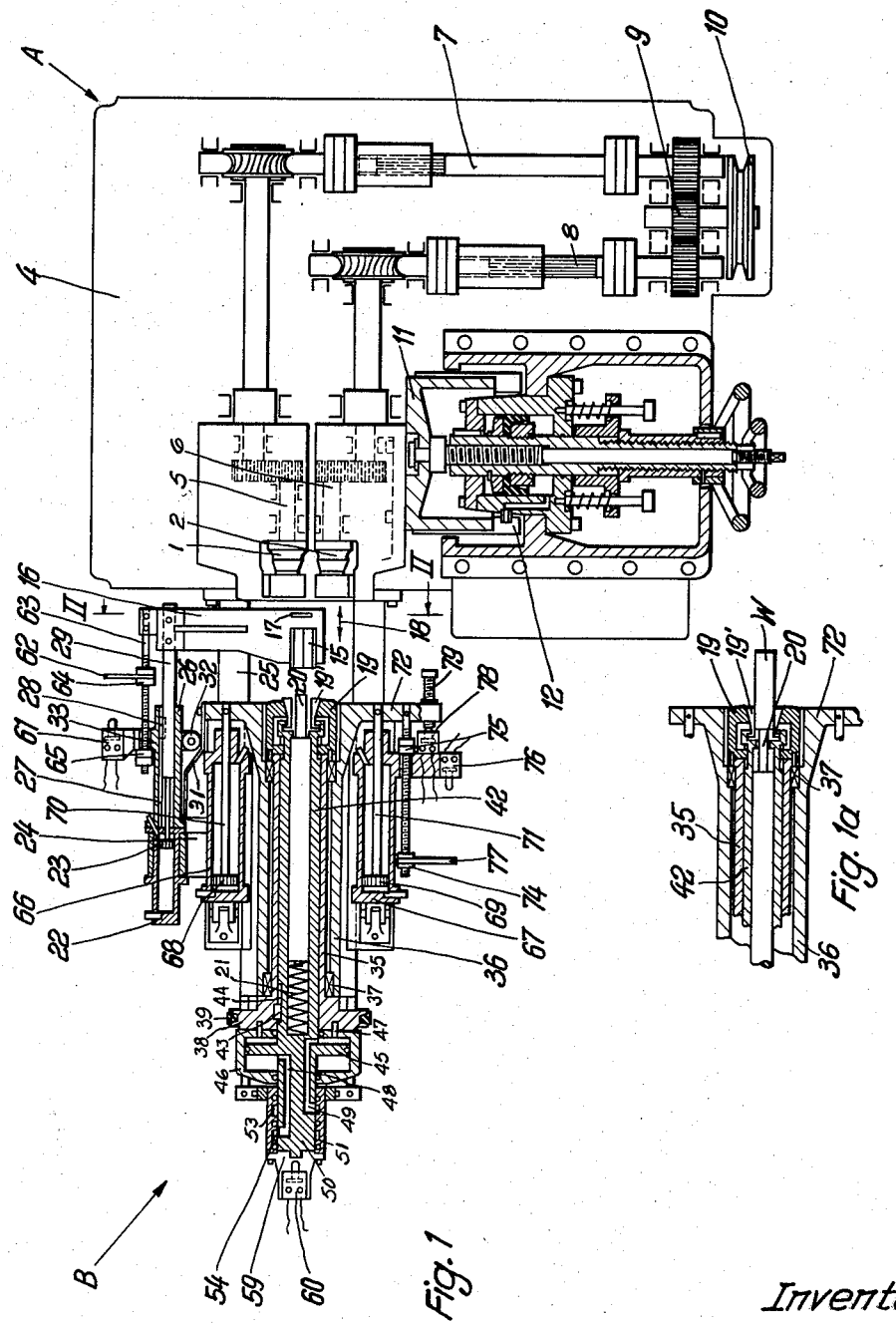
FIG. 1 shows a top view, partly in section, of our new feeding apparatus marked B in combination with a known rolling machine marked A.

The right portion marked A of FIG. 1 illustrates a known rolling machine as used for example for thread rolling. It includes two cooperating profiling rollers 1, 2 mounted upon parallel shafts 5 and 6, respectively, and shaped to produce the desired surface profile such as threads, rotational bolt heads, beads or the like. Said shafts 5, 6 are driven by extensible intermediate shafts 7 and 8, respectively, from a gearing 9 which is rotated by the scored pulley 10. It will be understood that more than two profiling rollers may be used if necessary to achieve substantial profiling deformations, in which case the above described driving mechanism is accordingly adapted. As shown in FIG. 1 the roller shaft 6 is mounted in a sliding support 11 displaceably resting upon slide guides 12 arranged on the machine frame 4, thus permitting said support 11 and the roller shaft 6 to be transversely displaced relative to the shaft 5 which may be undisplaceably mounted on frame 4. The known pneumatic device for displacing the support 11 is not shown in the drawing.

The preferably red-hot work pieces W such as bolts are introduced into the feeding apparatus by an inclined chute 13 (FIG. 2), in which they are individually released by an electromagnetically operated release mechanism 83 and when released actuate an electrical switch 14, the function of which will be later fully explained. Each workpiece W leaving the chute 13 falls into a saddle or similar sustaining member 15 attached to a swinging arm 16 which also holds a stop or guard or pushing member 17 in front of said saddle 15. Said arm 16 is attached to an actuating rod 29 by which it may be reciprocably displaced as indicated by arrows 18. When said arm 16 is in the horizontal position shown in FIG. 2 and is moved to the left (FIG. 1) the workpiece resting in the saddle 15 is pushed by the stop 17 into the chuck 19 between its gripping jaws 19' and against the ejector 20 loaded by the spring 21. The said reciprocable movement of the arm 16 is effected by a pneumatic cylinder 22 which, for reasons to be explained hereinafter, is rotatably seated in a bracket 24 of the apparatus frame 25. The piston 23 in said cylinder 22 is attached to said actuating rod 29 which is guided by the slot and feather 27, 28 within the integral tubular extension 26 of said rotatably seated cylinder 20.

Figure 2:
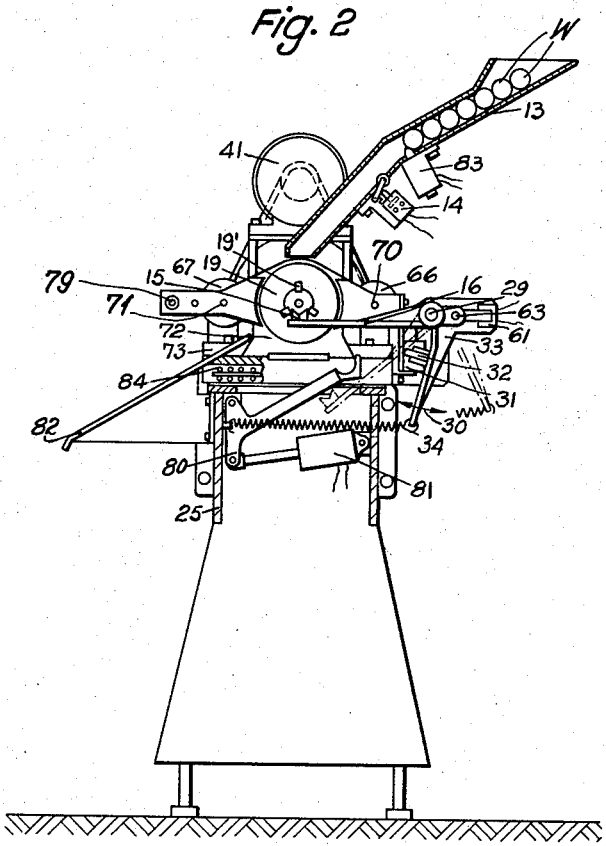
FIG. 2 is a side view, partly in section, of our new device taken substantially along line II—II in FIG. 1.

The said rotatable mounting of the pneumatic cylinder 22 and of its tubular extension 26, in which the actuating rod 29 is slidably guided, permits to impart to the arm 16 a swinging movement in the direction indicated by arrows 30 in FIG. 2 in addition to the reciprocable movement indicated by arrows 18 (FIG. 1). This swinging movement is effected by a cam surface 31 acting on a roller 32. Cam surface 31 is positioned on a slide 72, described more fully hereinafter, which is reciprocable toward and away from the rolling machine. Roller 32 is rotatably mounted on an arm 33 secured to the tubular guide member 26 and extending therefrom in angularly spaced relation to the aforementioned arm 16, as best seen in FIG. 2. The formation of cam surface 31, which is engaged by the roller 32, is such that, when slide 72 is moved toward the rolling machine, the roller 32 effects swinging movement of arms 33 in a counter-clockwise direction and against the force of the tension spring 34. In FIG. 2, the parts are shown with the charging device 15 in its charging position wherein it is interposed between the chuck 19 and the rolling machine. As the arm 33 is swung clockwise during advance of slide 72 toward the rolling machine, the charging device 15 is swung to the dotted line retracted position out of the path of movement of slide 72 and chuck 19. When slide 72 is retracted from the rolling machine, the tension of spring 34, in combination with the interaction between the roller 32 and the cam surface 31, causes the charger 15 to be rotated clockwise back to the charging position shown in FIG. 2.

The clamping chuck 19 is rigidly connected to the sleeve 35 which is rotatably mounted upon roller bearings 37 within a cylindrical housing 36 which extends in axial direction in or from a slide or carriage 72 (FIGS. 1 and 1a). The said sleeve 35 is attached to or integral with a belt pulley 38. This belt pulley 38 is driven by a wedge-shaped belt 39 passing over the rim of the pulley-shaped driven part of a slipping or override coupling 40 or other equalizing transmission drive. This slipping or override coupling 40 is shown in FIG. 4 and will be later fully described; its driving part is constantly driven with unchanging rotational speed by the shaft 41a of an electric motor 41.

A tubular pull member 42, which freely embraces the base portion of the ejector 20, is mounted displaceably in its axial direction in the rotating sleeve 35 and is connected thereto by the feather and slot 43, 44 which permit a limited axial displacement of pull member 42 for actuating the gripping jaws 19' of the chuck 19. Such axial displacement is effected by the piston 45 which is rigidly connected to or integral with said pull rod 42 and operates within the pneumatic cylinder 46 which is attached by pins 47 to the belt pulley 38 to rotate therewith and with the sleeve 35.

Compressed air is introduced into said cylinder 46 through ports 48, 49 which are arranged in a trunnion 50 appended to the piston 45. Said trunnion 50 rotates in a bushing 51 which is provided with two ring grooves 53, 54 into which communicating through connections 55, 56 with the feed lines 57, 58 for compressed air (FIG. 3). Said ports 48, 49 and said ring grooves 53, 54 operate like a piston valve controlling the movement of the piston 45 and thus of the push member 42 which actuates the gripping jaws 19'. The bushing 51 is provided with a bracket 59 which supports an electrical push-button switch 60 which is actuated when the pull rod 42 moves to the left as seen in FIG. 1 and the gripping jaws 19' clamp the workpiece introduced therebetween.

The clamping of the workpiece W in the chuck 19 is initiated by the switch 61 which is mounted on the tubular guide member 26 and thus shares its rotational movement indicated by arrows 30 in FIG. 2. This switch 61 is actuated by the contact arm 62 extending from the nut 64 which is adjustable on the screw spindle 63. The nut 64 serves also in cooperation with a counter stop member on the arm 33 to end the inserting leftward movement (as seen in FIG. 1) of the workpiece into the chuck 19. The reverse movement, i.e. to the right, effecting the feed of the clamped workpiece between the profiling rollers 1, 2, is controlled by the other unit 65 on screw spindle 63 which also cooperates with the said counter stop member on arm 33.

The above cited switch 60 initiating the feed movement of the chuck 19 towards the said profiling rollers 1, 2, operates electro-magnetically valves (not shown) governing the flow of compressed air to two stationary cylinders 66, 67 arranged on each side of the spindle housing 36 within the carriage or slide box 72 which is guided in saddle guides 73 (FIG. 2). In said cylinders 66, 67 operate pistons 68, 69 upon piston rods 70, 71 whose outer ends are rigidly attached to said slide box 72. Thus compressed air introduced into said cylinders through not shown controlled conduits at one or the other side of said pistons will cause the slide box 72 to move in one or the other of the directions indicated by arrows 18. Such movements are limited by the stop nuts 74, 75 adjustably seated on a screw spindle associated with the slide box 72. The stop nut 74 carries a contact arm 77 which actuates a switch 76 at the end of the forward movement of the slide box 72 towards the profiling rollers 1, 2; the actuated switch 76 initiates the forward movement of the slidable roller support 11. The other stop nut 75 limits the return movement of the slide box 72 and at the end of such return movement the switch 78, which is associated with said nut 75, is actuated by the bolt 79 screwed into slide box 72. This switch 78 operates a not shown solenoid valve which reverses the operation of the piston 45 in cylinder 46 whereby this piston moves forward (i.e. to the right as shown in FIG. 1) opening the chuck jaws 19' and releasing the workpiece held therebetween thus permitting the spring loaded ejector 20 to eject the workpiece therefrom. The ejected workpiece falls upon a transfer lever 80 (FIG. 2) which is operated by the solenoid 81 and which places the workpiece upon the slide 82. Simultaneously with the solenoid 81 the above referred to electro-magnetically operated release mechanism 83 in chute 13 is actuated releasing another workpiece to fall upon the saddle 15 and to be operated on as described before. Such workpiece while sliding downward in chute 13 actuates the switch 14 which effects by known means not shown in the drawing a forward movement of the arm 16 from its position shown in FIG. 1 to the left for starting an operational cycle.

The return movement of the sliding support 11 for the profiling roller 1 and of the slide box 72 carrying the clamping chuck 19 is controlled in known manner by a time switch, not shown in the drawing, which is operated in dependence of the rolling process.

In case the roller shaft 5 is mounted fixedly upon the machine frame 4, the transverse movement of the workpiece during its rolling must be followed by a conforming transverse movement of the feeding and clamping means. For this purpose, the slide box 72 which as stated above, is in longitudinal direction displaceable between guides 73, is also transversely displaceable upon a chain of rollers 84 (FIG. 2).

An embodiment of the slipping or overriding coupling inserted between the driving motor 41 and the feeding and clamping mechanism for the workpieces is shown in FIG. 4. The driving or inner part of the clutch is keyed upon the motor shaft 41a and the driven or outer part rotatably fitted on said inner part is constructed as a belt pulley 40. Said inner part of the clutch is provided with four wedge-shaped chambers $40^2$ each of which houses a spring-loaded steel ball $40^1$. When the motor shaft 41a rotates in counter-clockwise direction as indicated by the arrow, the balls $40^1$ are wedged in their respective chambers $40^2$ and carry the outer pulley-shaped clutch part namely the pulley 40. The electric motor 41 imparts to the workpiece W held in the chuck 19 a slower rotation than it will receive when later operated by the rotating profiling rollers 1, 2. Thus, when during the rolling operation the rotational speed of the workpiece increases, the rotational speed of the workpiece imparted by the motor 41 is overridden by the belt-pulley 40 which will rotate in reverse direction at a speed equal to the difference of the said rotational speeds. Thereby the uninterrupted rotation imparted to the workpiece by the constantly rotating clamping chuck is independent from the momentarily existing ratio of the diameters of the profiling rollers 1, 2 and the workpiece W. The clutch shown in FIG. 4 may of course be substituted by any other known equalizing transmission drive.

While we have shown and described in detail a specific embodiment of our invention to illustrate the application of its principles, it will be well understood that our invention may be otherwise embodied without departing from such principles and without avoiding the scope of the appended claims.

What we claim as our invention is:

1. A transfer device for transferring workpieces from a first working station to a second working station having rotatable profiling rollers comprising in combination a reciprocably mounted support; a chuck body rotatably mounted in said support and including a plurality of clamping jaws; a reciprocable tubular pull member actuating said clamping jaws to seize and to release, respectively, the workpiece loaded in said chuck body; a spring loaded ejector longitudinally extending within said tubular pull member adapted to eject any workpiece released by the clamping jaws; first actuating means associated with said tubular pull member to effect its reciprocating movement for operation of the clamping jaws; a swing arm mounted for a swinging movement in substantially vertical direction between the profiling rollers and said support; means mounting said swing arm for lateral displacement in axial direction of the chuck; a sustaining member on said swing arm adapted to receive a workpiece from the first working station and to load such workpiece between the open clamping jaws during said lateral displacement of said arm; second actuating means associated with the said swing arm to effect its said lateral displacement for loading a workpiece into the chuck; third actuating means associated with said swing arm to effect its swing movement out of its chuck loading position after the workpiece has been clamped between the clamping jaws; fourth actuating means associated with said support to reciprocate said support toward and from the second working station; electrically operated control means for the said actuating means; and slipping or overriding driving means rotating the chuck body to compensate the difference of the angular velocities of the chuck body and of the profiling rollers of the second working station, respectively.

2. A transfer device according to claim 1 wherein the said first actuating means comprise a piston integrated with the tubular pull member; a working cylinder housing said piston; said cylinder rotatably connected to the chuck body, and further comprising a follower pulley rigidly connected to said cylinder, rotatably mounted on said tubular pull member and driven by said slipping or overriding driving means.

3. A transfer device according to claim 2 comprising a trunnion integrated with said piston; a stationary bearing for said trunnion; distributing channels in said trunnion for a compressed medium actuating said piston; ring grooves in said bearing cooperating with said channels; and ports in said bearing admitting the compressed medium to said channels.

4. A transfer device according to claim 1, wherein the said second and fourth actuating means each comprise a pair of adjustable stop nuts limiting the lateral displacement of the swing arm of the slide, respectively.

5. A transfer device according to claim 1, comprising conduits for a compressed medium operating said actuating means and electromagnetical valves within said conduits operated by said control means.

6. A transfer device for positioning workpieces in a machine having rotatable profiling rollers, said transfer device comprising, in combination, a slide mounted for reciprocation toward and away from said machine; a chuck rotatably mounted on said slide and including workpiece gripping means; a charger mounted between said slide and said machine and movable laterally between a charging position, aligned with said chuck, and a retracted position; means mounting said charger for reciprocation towards said chuck to charge a workpiece into the latter; means biasing said charger to the charging position; means operable, responsive to advance of said slide towards said machine, to move said charger towards its retracted position; and means, including an override device, rotating said chuck at an angular velocity less than that of said profiling rollers, said override device providing compensation for such difference in angular velocities when a workpiece in said chuck is rotated by the profiling rollers.

References Cited in the file of this patent

UNITED STATES PATENTS

| | | |
|---|---|---|
| 315,349 | Sheldon | Apr. 7, 1885 |
| 408,673 | Rogers | Aug. 6, 1889 |
| 2,544,218 | Burdsall | Mar. 6, 1951 |
| 2,570,660 | Gamble | Oct. 9, 1951 |